(12) United States Patent
Yi et al.

(10) Patent No.: US 10,536,895 B2
(45) Date of Patent: Jan. 14, 2020

(54) METHOD AND APPARATUS FOR PERFORMING INITIAL ACCESS PROCEDURE FOR LOW COST USER EQUIPMENT IN WIRELESS COMMUNICATION SYSTEM

(71) Applicant: LG ELECTRONICS INC., Seoul (KR)

(72) Inventors: Yunjung Yi, Seoul (KR); Hyangsun You, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 4 days.

(21) Appl. No.: 15/568,678

(22) PCT Filed: May 13, 2016

(86) PCT No.: PCT/KR2016/005099
§ 371 (c)(1),
(2) Date: Oct. 23, 2017

(87) PCT Pub. No.: WO2016/182391
PCT Pub. Date: Nov. 17, 2016

(65) Prior Publication Data
US 2018/0192354 A1    Jul. 5, 2018

Related U.S. Application Data

(60) Provisional application No. 62/161,214, filed on May 13, 2015.

(51) Int. Cl.
*H04W 48/12* (2009.01)
*H04W 72/12* (2009.01)
(Continued)

(52) U.S. Cl.
CPC .......... *H04W 48/12* (2013.01); *H04W 48/16* (2013.01); *H04W 72/1289* (2013.01);
(Continued)

(58) Field of Classification Search
CPC ...... H04W 48/16; H04W 46/12; H04W 48/12
(Continued)

(56) References Cited

U.S. PATENT DOCUMENTS

2013/0083753 A1*   4/2013   Lee ................... H04W 74/0833
                                                              370/329
2014/0185540 A1*   7/2014   Gaal ..................... H04L 1/1867
                                                              370/329

(Continued)

FOREIGN PATENT DOCUMENTS

WO     WO 2013/129883 A1      9/2013

OTHER PUBLICATIONS

Ericsson, "EPDCCH initialization and reconfiguration for MTC", R1-151213, 3GPP TSG RAN WG1 Meeting #80bis, Belgrade, Serbia, Apr. 20-24, 2015, 7 pgs.

(Continued)

*Primary Examiner* — Angel T Brockman
(74) *Attorney, Agent, or Firm* — Birch, Stewart, Kolasch & Birch, LLP

(57) ABSTRACT

A method and apparatus for receiving a downlink message in a wireless communication system is provided. A user equipment (UE) receives scheduling information for a downlink message via a dedicated common search space (D-CSS) in a first narrowband from a network, and receives the downlink message in the second narrowband from the network. The D-CSS may schedule resources for random access response (RAR)/Msg4 and initial configuration of UE-specific configurations before UE-specific narrowband (NB) is configured. CSS in UE-specific NB may schedule
(Continued)

resources for RAR/Msg4/paging and reconfiguration of UE-specific configurations after UE-specific NB is configured.

2 Claims, 9 Drawing Sheets

(51) Int. Cl.
*H04W 48/16* (2009.01)
*H04W 74/08* (2009.01)
*H04W 76/27* (2018.01)
*H04W 72/04* (2009.01)

(52) U.S. Cl.
CPC ...... *H04W 74/0833* (2013.01); *H04W 72/042* (2013.01); *H04W 76/27* (2018.02)

(58) Field of Classification Search
USPC .......................................... 370/329
See application file for complete search history.

(56) References Cited

U.S. PATENT DOCUMENTS

2014/0307560 A1 10/2014 Kim et al.
2016/0212664 A1* 7/2016 Uemura ................ H04W 24/08

OTHER PUBLICATIONS

NTT DOCOMO et al., "WF on UE-specific EPDCCH set initialization", R1-152346, 3GPP TSG RAN WG1 #80bis, Belgrade, Serbia, Apr. 20-24, 2015, 3 pgs.
NTT DOCOMO, "EPDCCH configuration for Rel-13 low complexity MTC", R1-152050, 3GPP TSG RAN WG1 Meeting #80bis, Belgrade, Serbia, Apr. 20-24, 2015, 5 pgs.

* cited by examiner

[Fig. 1]
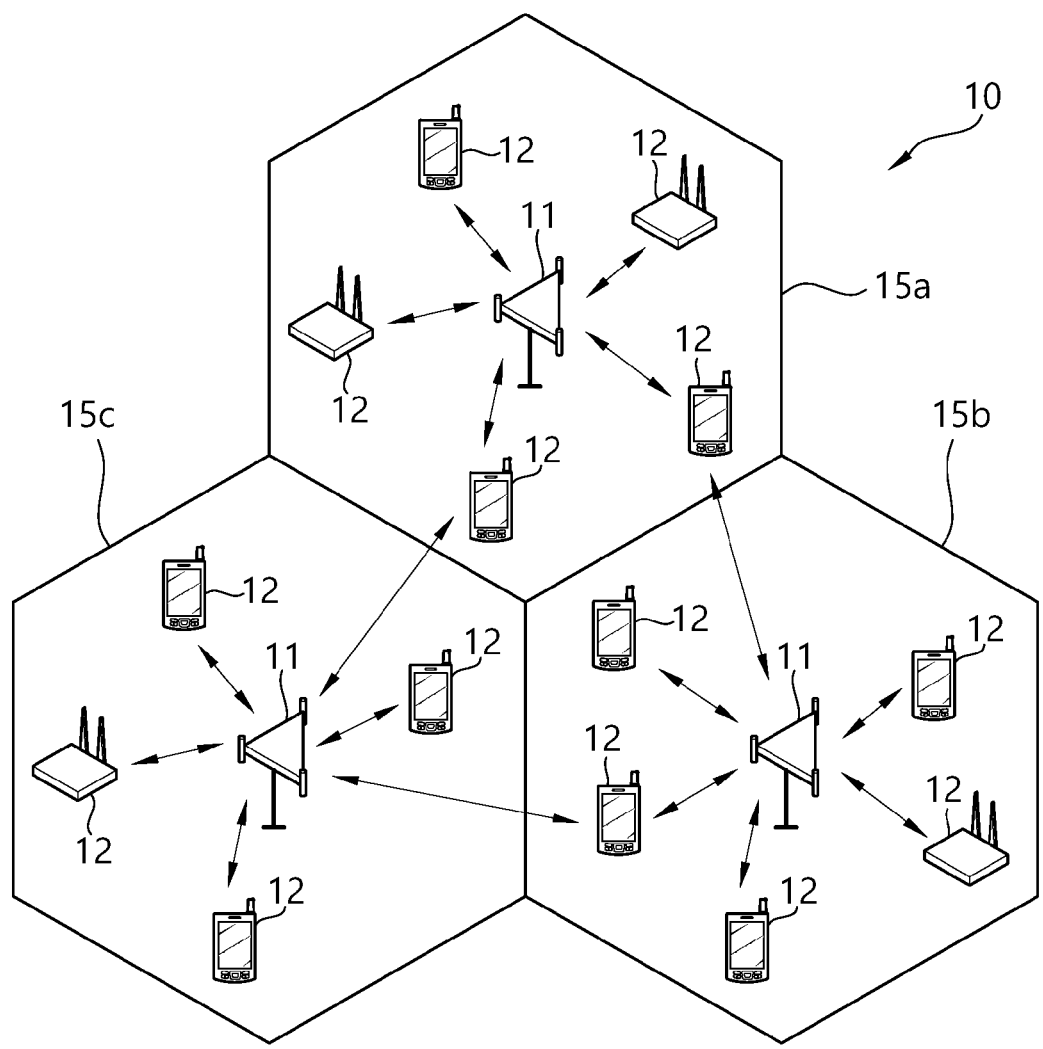
[Fig. 2]
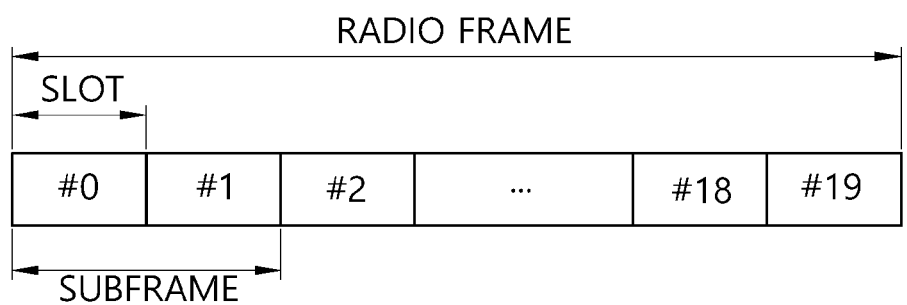

[Fig. 3]
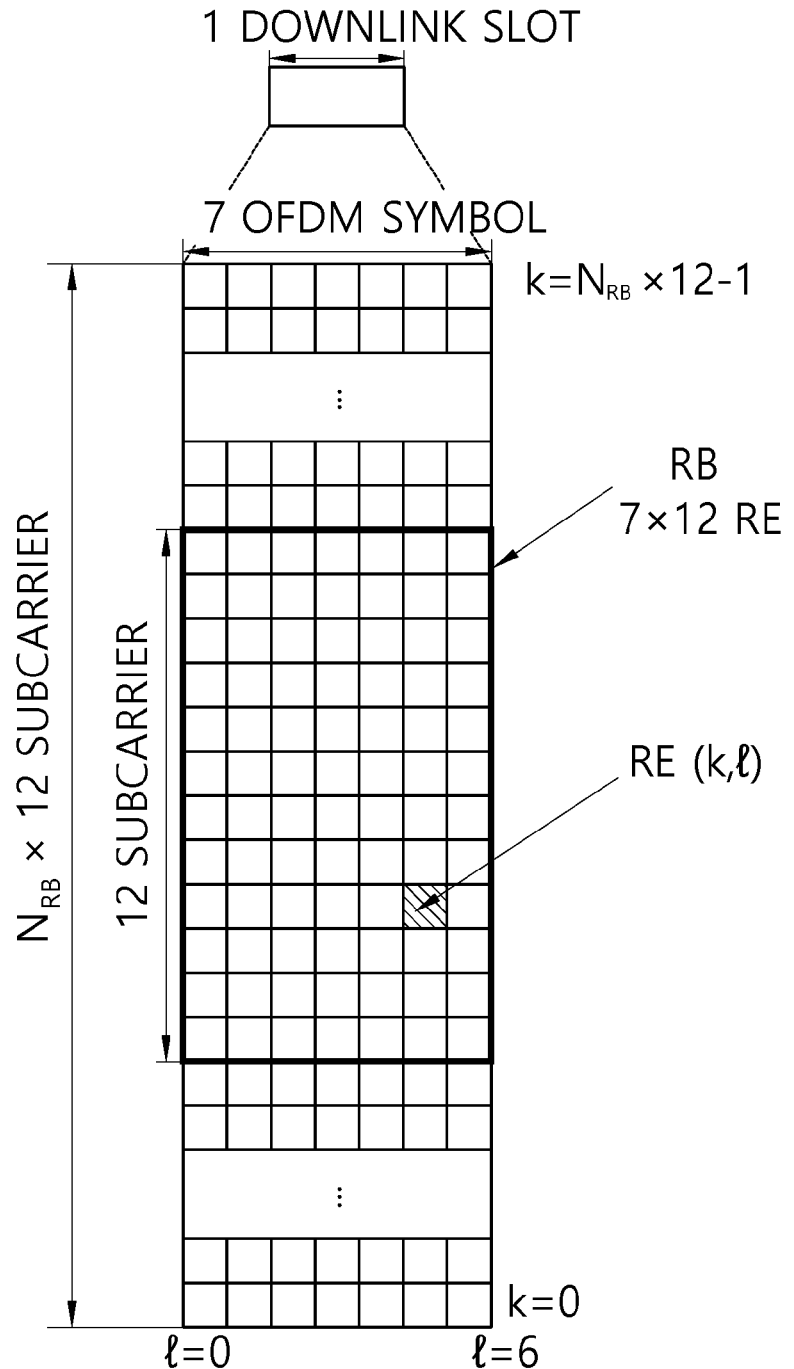

[Fig. 4]
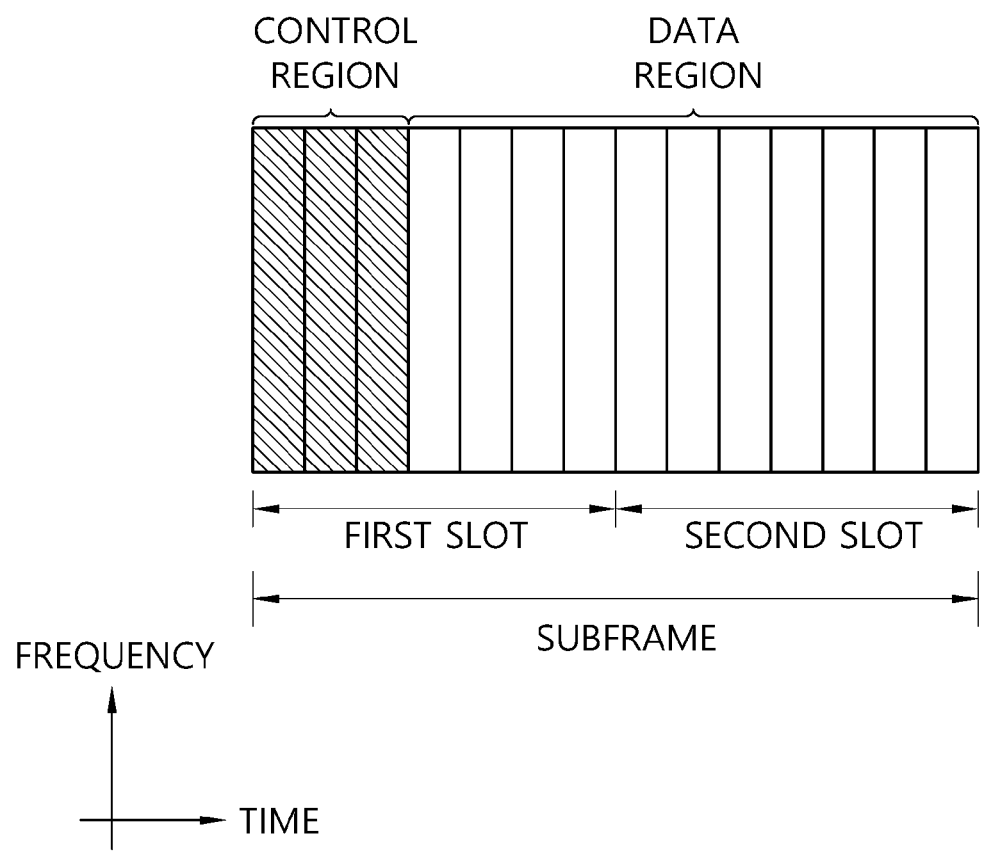

[Fig. 5]
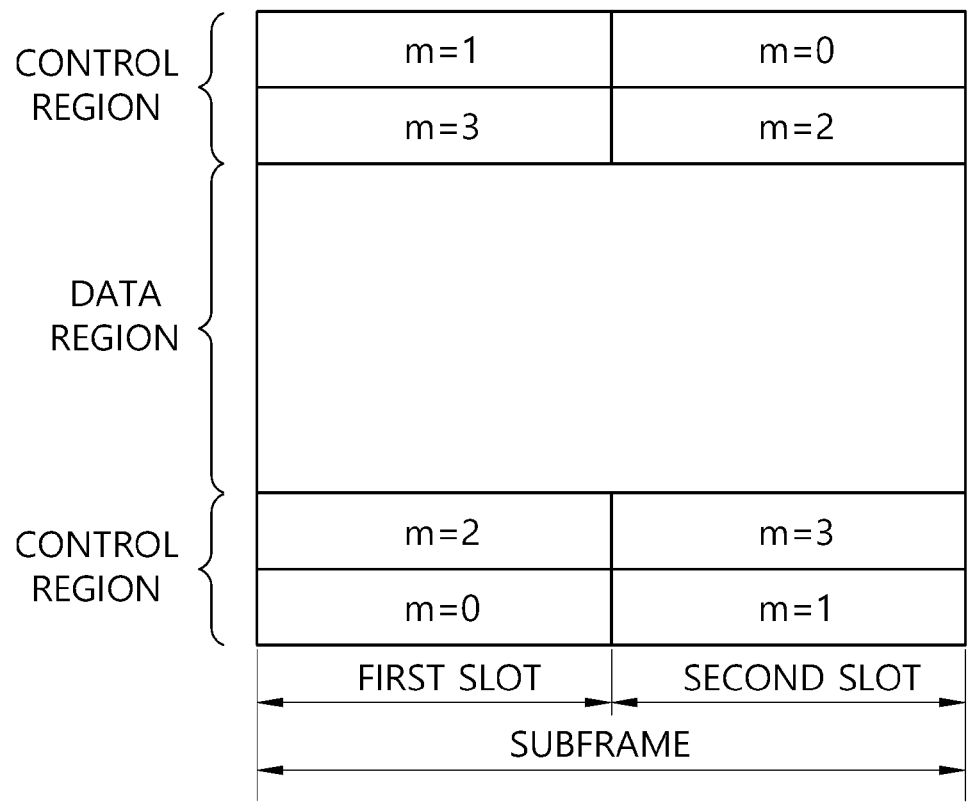

[Fig. 6]
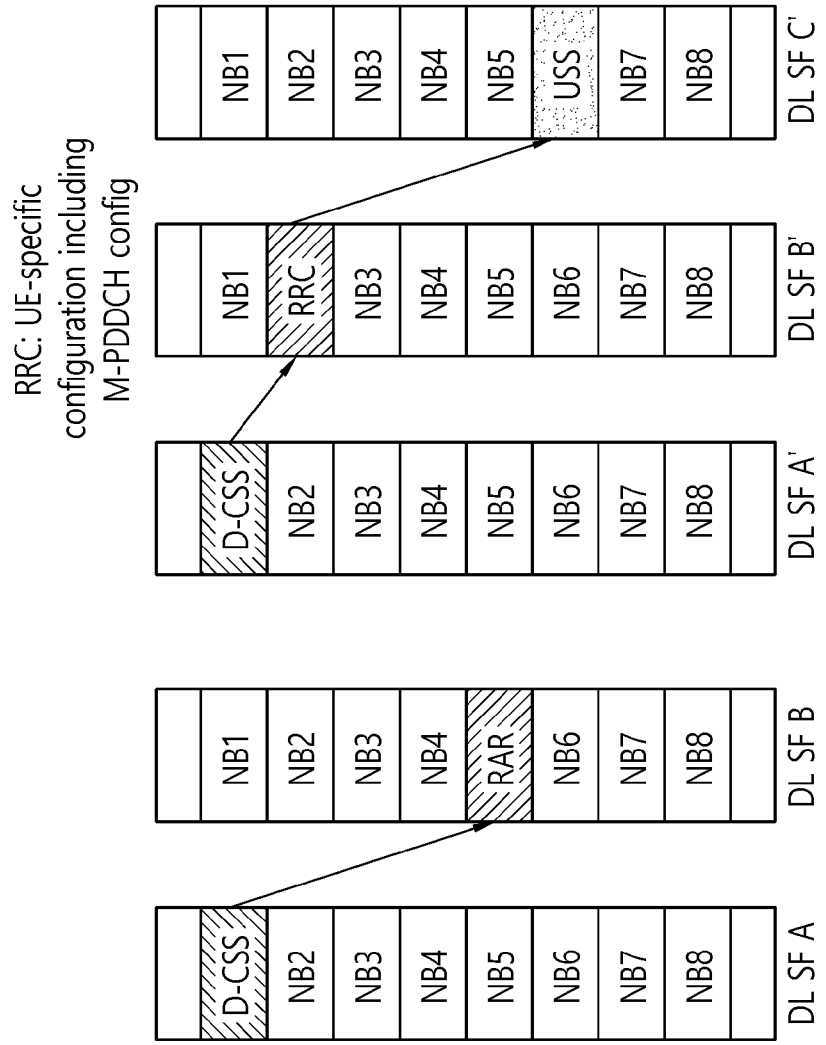

[Fig. 7]
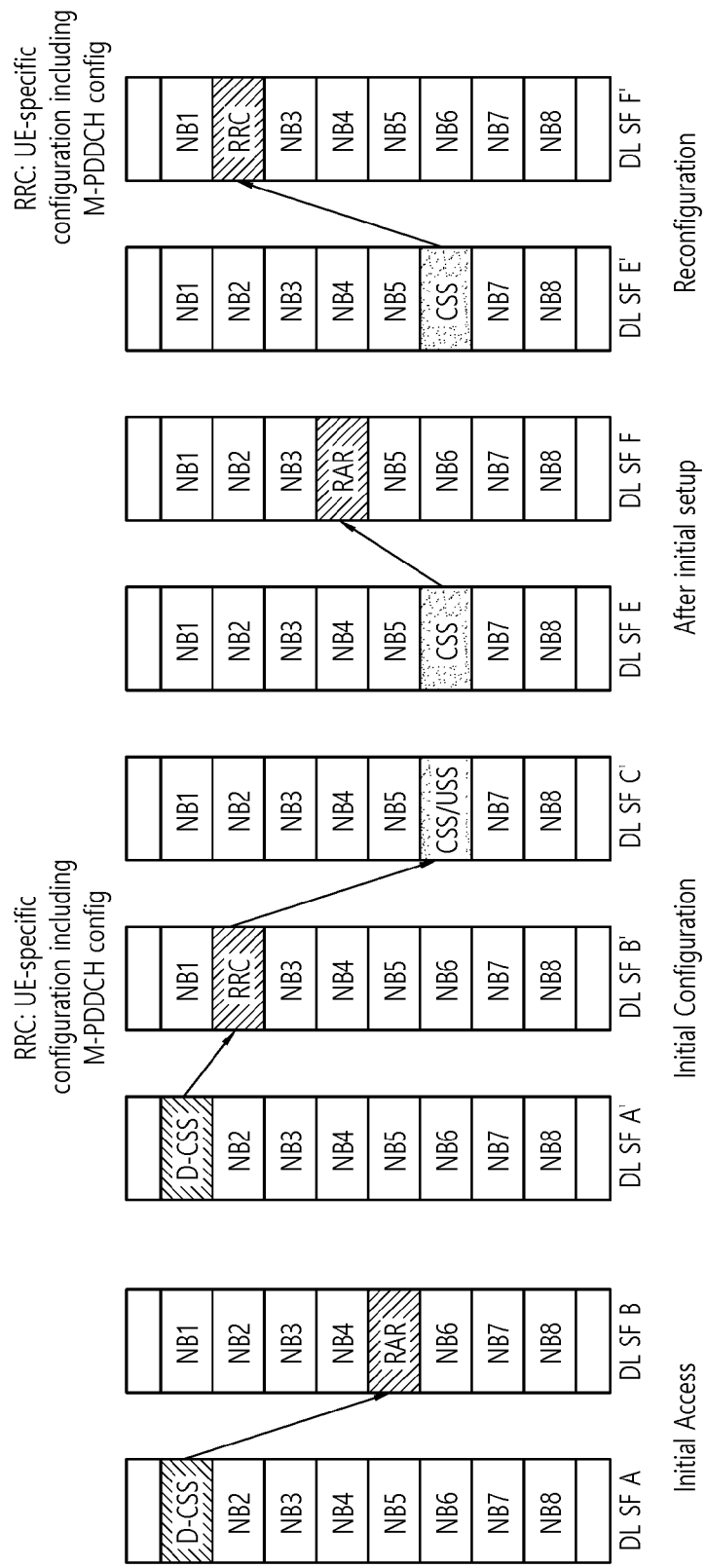

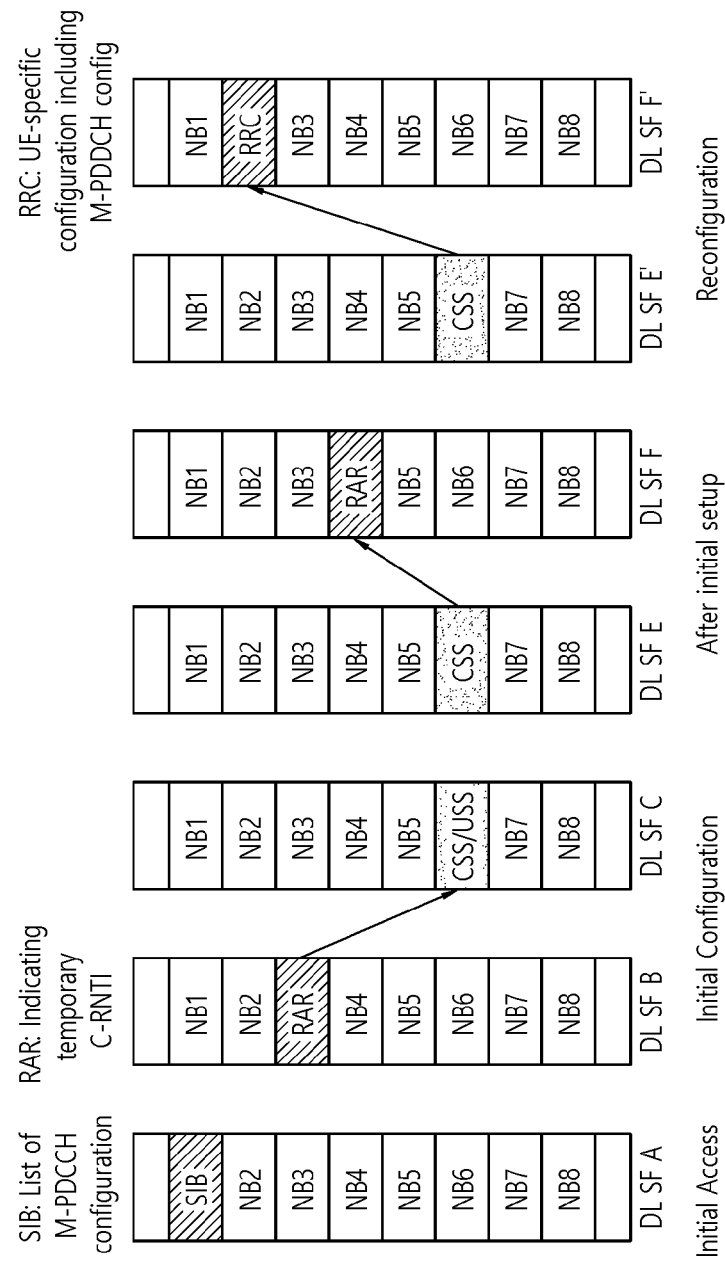
[Fig. 8]

[Fig. 9]
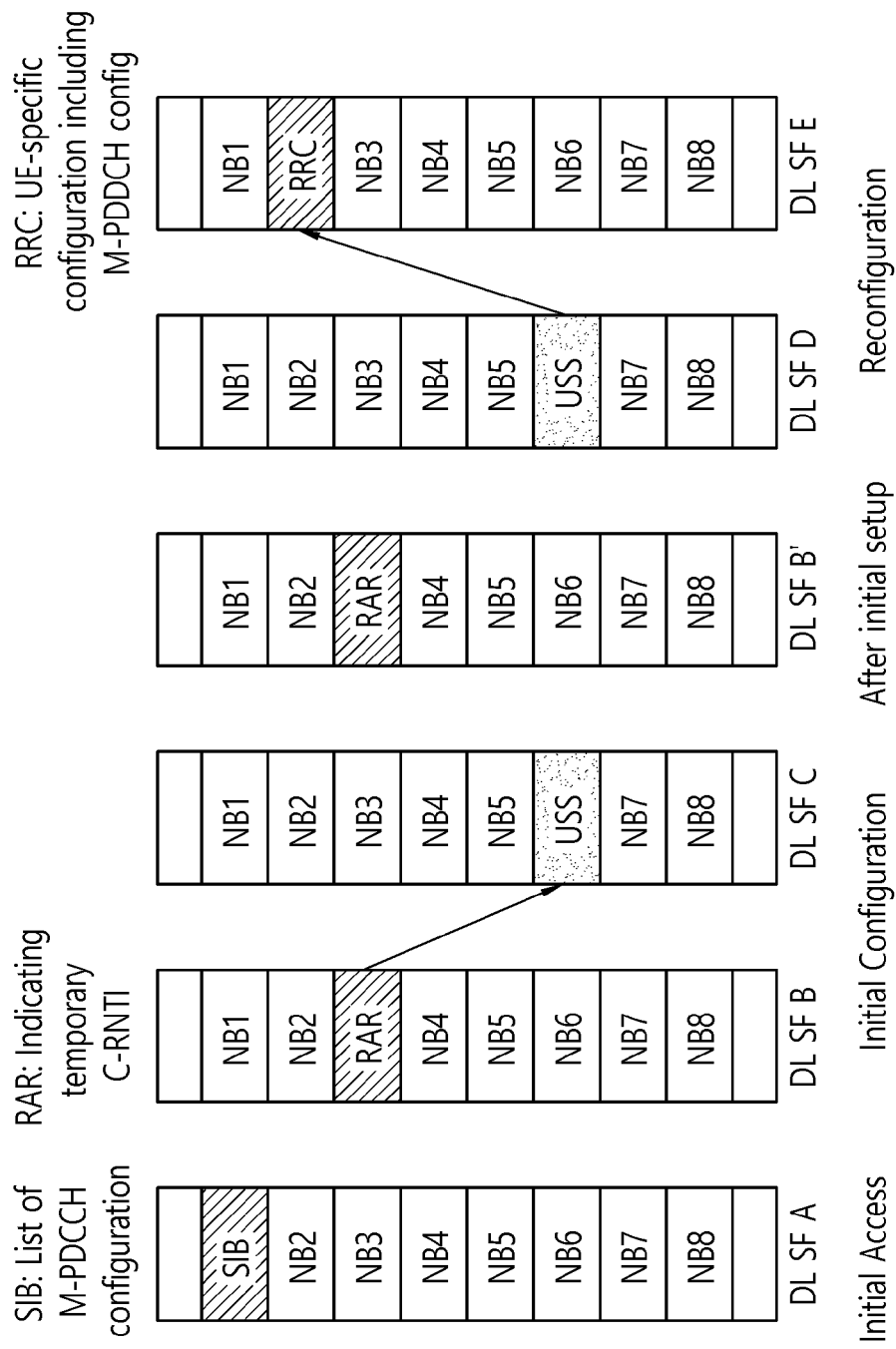

[Fig. 10]
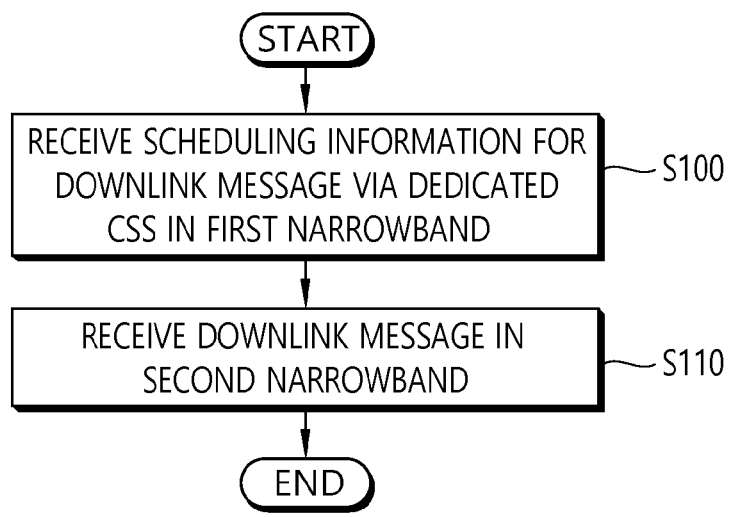
[Fig. 11]
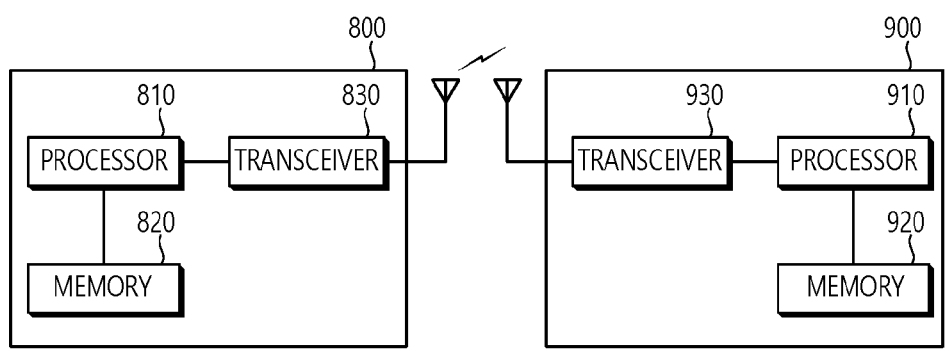

METHOD AND APPARATUS FOR PERFORMING INITIAL ACCESS PROCEDURE FOR LOW COST USER EQUIPMENT IN WIRELESS COMMUNICATION SYSTEM

CROSS REFERENCE TO RELATED APPLICATIONS

This application is the National Phase of PCT International Application No. PCT/KR2016/005099, filed on May 13, 2016, which claims priority under 35 U.S.C. 119(e) to U.S. Provisional Application No. 62/161,214, filed on May 13, 2015, all of which are hereby expressly incorporated by reference into the present application.

TECHNICAL FIELD

The present invention relates to wireless communications, and more particularly, to a method and apparatus for performing an initial access procedure for a low cost user equipment (UE) in a wireless communication system.

BACKGROUND ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

In the future versions of the LTE-A, it has been considered to configure low-cost/low-end (or, low-complexity) user equipments (UEs) focusing on the data communication, such as meter reading, water level measurement, use of security camera, vending machine inventory report, etc. For convenience, these UEs may be called machine type communication (MTC) UEs. Since MTC UEs have small amount of transmission data and have occasional uplink data transmission/downlink data reception, it is efficient to reduce the cost and battery consumption of the UE according to a low data rate. Specifically, the cost and battery consumption of the UE may be reduced by decreasing radio frequency (RF)/baseband complexity of the MTC UE significantly by making the operating frequency bandwidth of the MTC UE smaller.

Some MTC UEs may be installed in the basements of residential buildings or locations shielded by foil-backed insulation, metalized windows or traditional thick-walled building construction. These MTC UEs may experience significantly greater penetration losses on the radio interface than normal LTE UEs. Thus, for these MTC UEs, coverage enhancement may be required. The MTC UEs in the extreme coverage scenario may have characteristics such as very low data rate, greater delay tolerance, and no mobility, and therefore, some messages/channels may not be required.

When a MTC UEs are introduced, a new feature for an initial access process may be required.

DISCLOSURE OF INVENTION

Technical Problem

The present invention provides a method and apparatus for performing an initial access procedure for a low cost user equipment (UE) in a wireless communication system. The present invention discusses how to create/handle a UE with limited radio frequency (RF) capability to receive downlink data successfully serviced by a wideband system bandwidth network. The present invention particularly focuses on the initial access procedure. The present invention provides a method and apparatus for scheduling for a random access response (RAR), a paging message and/or a contention resolution message.

Solution to Problem

In an aspect, a method for receiving, by a user equipment (UE), a downlink message in a wireless communication system is provided. The method includes receiving scheduling information for a downlink message via a dedicated common search space (D-CSS) in a first narrowband from a network, and receiving the downlink message in the second narrowband from the network.

In another aspect, a user equipment (UE) in a wireless communication system is provided. The UE includes a memory, a transceiver, and a processor coupled to the memory and the transceiver. The processor is configured to control the transceiver to receive scheduling information for a downlink message via a dedicated common search space (D-CSS) in a first narrowband, and control the transceiver to receive the downlink message in the second narrowband.

Advantageous Effects of Invention

Initial access procedure for a low cost UE can be performed efficiently.

BRIEF DESCRIPTION OF DRAWINGS

FIG. 1 shows a wireless communication system.
FIG. 2 shows structure of a radio frame of 3GPP LTE.
FIG. 3 shows a resource grid for one downlink slot.
FIG. 4 shows structure of a downlink subframe.
FIG. 5 shows structure of an uplink subframe.
FIG. 6 shows an example of scheduling DL messages according to an embodiment of the present invention.
FIG. 7 shows another example of scheduling DL messages according to an embodiment of the present invention.
FIG. 8 shows another example of scheduling DL messages according to an embodiment of the present invention.
FIG. 9 shows another example of scheduling DL messages according to an embodiment of the present invention.
FIG. 10 shows a method for receiving, by a UE, a downlink message according to an embodiment of the present invention.
FIG. 11 shows a wireless communication system to implement an embodiment of the present invention.

MODE FOR THE INVENTION

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

FIG. 1 shows a wireless communication system. The wireless communication system 10 includes at least one evolved NodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

FIG. 2 shows structure of a radio frame of 3GPP LTE. Referring to FIG. 2, a radio frame includes 10 subframes. A subframe includes two slots in time domain. A time for transmitting one transport block by higher layer to physical layer (generally over one subframe) is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 resource elements. The number NAL of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7, and in case of an extended CP, the number of OFDM symbols is 6. One of 128, 256, 512, 1024, 1536, and 2048 may be selectively used as the number of subcarriers in one OFDM symbol.

FIG. 4 shows structure of a downlink subframe. Referring to FIG. 4, a maximum of three OFDM symbols located in a front portion of a first slot within a subframe correspond to a control region to be assigned with a control channel. The remaining OFDM symbols correspond to a data region to be assigned with a physical downlink shared chancel (PD-CCH). Examples of DL control channels used in the 3GPP LTE includes a physical control format indicator channel (PCFICH), a physical downlink control channel (PDCCH), a physical hybrid automatic repeat request (HARQ) indicator channel (PHICH), etc. The PCFICH is transmitted at a first OFDM symbol of a subframe and carries information regarding the number of OFDM symbols used for transmission of control channels within the subframe. The PHICH is a response of UL transmission and carries a HARQ acknowledgment (ACK)/non-acknowledgment (NACK)

signal. Control information transmitted through the PDCCH is referred to as downlink control information (DCI). The DCI includes UL or DL scheduling information or includes a UL transmit (TX) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of TX power control commands on individual UEs within an arbitrary UE group, a TX power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups.

A format of the PDCCH and the number of bits of the available PDCCH are determined according to a correlation between the number of CCEs and the coding rate provided by the CCEs. The eNB determines a PDCCH format according to a DCI to be transmitted to the UE, and attaches a cyclic redundancy check (CRC) to control information. The CRC is scrambled with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be scrambled to the CRC. Alternatively, if the PDCCH is for a paging message, a paging indicator identifier (e.g., paging-RNTI (P-RNTI)) may be scrambled to the CRC. If the PDCCH is for system information (more specifically, a system information block (SIB) to be described below), a system information identifier and a system information RNTI (SI-RNTI) may be scrambled to the CRC. To indicate a random access response that is a response for transmission of a random access preamble of the UE, a random access-RNTI (RA-RNTI) may be scrambled to the CRC.

FIG. 5 shows structure of an uplink subframe. Referring to FIG. 5, a UL subframe can be divided in a frequency domain into a control region and a data region. The control region is allocated with a physical uplink control channel (PUCCH) for carrying UL control information. The data region is allocated with a physical uplink shared channel (PUSCH) for carrying user data. When indicated by a higher layer, the UE may support a simultaneous transmission of the PUSCH and the PUCCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary. This is said that the pair of RBs allocated to the PUCCH is frequency-hopped at the slot boundary. The UE can obtain a frequency diversity gain by transmitting UL control information through different subcarriers according to time.

UL control information transmitted on the PUCCH may include a HARQ ACK/NACK, a channel quality indicator (CQI) indicating the state of a DL channel, a scheduling request (SR), and the like. The PUSCH is mapped to a UL-SCH, a transport channel. UL data transmitted on the PUSCH may be a transport block, a data block for the UL-SCH transmitted during the TTI. The transport block may be user information. Or, the UL data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the UL data may include only control information.

In the current LTE specification, all UEs shall support maximum 20 MHz system bandwidth, which requires baseband processing capability to support 20 MHz bandwidth. To reduce hardware cost and battery power of the UE used for machine type communication (MTC), reducing bandwidth is a very attractive option. To enable narrow-band MTC UEs, the current LTE specification shall be changed to allow narrow-band UE category. If the serving cell has small system bandwidth (smaller than or equal to bandwidth that narrow-band UE can support), the UE can attach based on the current LTE specification. Hereinafter, a MTC UE may be referred to as one of a UE requiring coverage enhancement (CE), a low cost UE, a low end UE, a low complexity UE, a narrow(er) band UE, a small(er) band UE, or a new category UE. Or, just a UE may refer one of UEs described above.

In the description below, a case where system bandwidth of available cells is larger than bandwidth that new category narrow-band UEs can support may be assumed. For the new category UE, it may be assumed that only one narrow-band is defined. In other words, all narrow-band UE shall support the same narrow bandwidth smaller than 20 MHz. It may be assumed that the narrow bandwidth is larger than 1.4 MHz (6 PRBs). However, the present invention can be applied to narrower bandwidth less than 1.4 MHz as well (e.g. 200 kHz), without loss of generality. Furthermore, in terms of UL transmission, a UE may be configured or scheduled with single or less than 12 tones (i.e. subcarriers) in one UL transmission to enhance the coverage by improving peak-to-average power ratio (PAPR) and channel estimation performance.

The followings may be assumed for the present invention described below:

(1) Operating bandwidth of a UE may be known to the eNB. To inform operating bandwidth, multiple approaches may be proposed. It may be assumed that that before scheduling any PDSCH/PUSCH, the eNB knows the operating bandwidth of a UE. In the description below, the operating bandwidth in terms of the number of PRBs of a narrow-band UE is given as $N_{RB}^{DL\_Op}$. It may be assumed that operating bandwidth is consistent for all narrow-band UEs within a cell. Also, UL transmission bandwidth of a narrow-band UE may be the same as the DL operating bandwidth, i.e. $N_{RB}^{DL\_Op}$. In other words, UL (RF and) baseband can process only narrow-band as well.

(2) Operating bandwidth of a UE may be equal to or larger than 1.4 MHz (or 6RB), and thus, the UE is able to receive physical broadcast channel (PBCH)/primary synchronization signal (PSS)/secondary synchronization signal (SSS) transmitted over center 6RB of system frequency band. Otherwise, a new signal similar to PBCH/PSS/SSS may be transmitted to narrower bandwidth. Even with supporting 1.4 MHz, it may be expected that a new signal for PBCH/PSS/SSS are considered to support a low cost UE. In this case, the new signal may be called MTC-PBCH, MTC-PSS and MTC-SSS.

(3) The present invention may be applied two scenarios: (1) RF is capable of receiving system bandwidth (e.g., 20 MHz) but baseband is capable of processing only narrow-band, (2) both RF and baseband can handle narrow bandwidth. If the first scenario is used, frequency retuning delay is not considered. If the second scenario is used, tuning delay to change frequency should be considered.

(4) This invention may assume that via RRC signaling (or other means) the UE is notified the number of symbols used for legacy PDCCH (sent over system bandwidth) after serving cell is established. At initial stage, upon receiving PBCH (i.e. discovering system bandwidth), the narrow-band UE may configure the default value for the number of symbols for legacy PDCCH to the maximum symbol counts based on system bandwidth (e.g. three for NRBDL=100).

(5) The narrow-band UE may support only one LTE band and single radio access technology (RAT). However, it is not precluded to consider inter-RAT handover case for a low cost UE. Just for the simplicity, this invention may assume single-RAT supporting UE.

(6) As the narrow-band UE cannot decode legacy PDCCH, another control channel mechanism (such as enhanced PDCCH transmitted/multiplexed in PDSCH area) may be assumed for supporting narrow-band UEs.

Once the network receives physical random access channel (PRACH) repetition, it may determine the repetition level required for random access response (RAR). In terms of RAR repetition number, there may be two approaches as follows.

(1) A UE may assume a constant repetition number which is determined based on PRACH CE level. For example, if PRACH uses 5 dB CE level, RAR may also be transmitted using 5 dB CE level.

(2) A UE cannot assume a constant repetition number. In this case, a UE may need to blindly search the repetition numbers of RAR.

Regardless of which approach is used, resource pool where RAR is transmitted may be defined at least before user-specific search space (USS) narrow-band is configured as follows.

(1) A set of separate resource pool may be defined per CE level: Either different narrow-band and/or time may be defined for different CE level. In this case, if the repetition number is not fixed, a UE may need to blindly search the number of repetitions. Another approach is to restrict the blind search candidates of repetition levels such that repetition number=K is defined for the CE level that PRACH has used, then a UE needs to blindly search K/2 and 2*K. The network may always transmit to 2*K repetition level where the UE reports the successful decoding repetition number in message 3 such that the network can know the required repetition number for DL transmission. Furthermore, the repetition number for message 3 may be determined according to PRACH (coarse granularity) or according to RAR. RAR may indicate the required number of repetitions for message 3.

(2) A common resource pool may be used where the RAR is differentiated by repetition number of RAR. The repetition number of RAR may correspond to the PRACH CE level.

(3) A set of separate narrow-band may be defined per CE level where CE level is determined by PRACH repetition level. The occasion of RAR in each narrow-band may be further determined by associated MTC PDCCH (M-PDCCH) or narrow-band occasion configured either implicitly (derived from PRACH configuration) or explicitly.

(4) M-PDCCH may indicate the narrow-band where RAR PDSCH is scheduled. M-PDCCH for this purpose may be scheduled via dedicated CSS narrow-band.

Once a UE is configured with C-RNTI and configured with USS narrow-band, RAR may be transmitted from USS narrow-band instead of above mechanism.

For the case of normal coverage, resource pool of RAR may be determined as follows.

M-PDCCH may indicate the narrow-band where RAR PDSCH is scheduled.

A dedicated narrow-band may be configured either by SIB or predefined, where RAR occasion is configured or implicitly determined based on PRACH configuration.

Center 6 PRBs may always be used for RAR transmission where RAR occasion may be determined based on RAR occasion configuration or based on PRACH configuration.

Hereinafter, a method for performing an initial access procedure for MTC UE according to an embodiment of the present invention is described. More specifically, resource configuration and scheduling for RAR/contention resolution message/paging according to an embodiment of the present invention is described. In the description below, RAR may be referred to as message 2 (Msg2), and contention resolution message may be referred to as message 4 (Msg4). Further, a dedicated common search space (D-CSS) may refer to a search space transmitted in a dedicated narrow-band which is either prefixed or configured by MTC-SIB. The D-CSS may perform frequency hopping per hopping pattern once frequency hopping is enabled. "NB" refers to a narrow-band. The entire system bandwidth may be divided in to a few narrow-bands and a set of narrow-bands usable for MTC UEs may be configured.

Overall, in terms of determining resources RAR/Msg4/paging, one the following options may be considered for both normal coverage and enhanced coverage modes. In terms of resource indication mechanism for RAR/Msg4/paging and also RRC messages, various design choices may be considered as follows depending on whether D-CSS is defined, whether a UE needs to hop between CSS and USS NBs due to configured in different NBs, and/or whether RAR and/or paging is scheduled with the associated M-PDCCH.

(1) Option 1: D-CSS+USS NB

In this option, D-CSS NB schedules resources for RAR/Msg4 and initial/reconfiguration of UE-specific configurations. D-CSS NB and USS NB may be different from each other. Time division multiplexing (TDM) may be necessary to support this option. Reconfiguration message which does not change either subband or CE level may be scheduled via USS as well.

(2) Option 2: D-CSS+CSS/USS in a UE-specific NB

In this option, D-CSS schedules resources for RAR/Msg4 and initial configuration of UE-specific configurations before UE-specific NB is configured. CSS in UE-specific NB may schedule resources for RAR/Msg4/paging and reconfiguration of UE-specific configurations after UE-specific NB is configured. TDM between CSS and USS in the same NB may be considered. At least different repetition levels may be used for CSS and USS.

(3) Option 3: Dedicated resource+CSS/USS in a UE-specific NB

In this option, a dedicated PDSCH or resource schedules RAR and initial configuration of UE-specific configuration before UE-specific NB is configured. For Msg4 transmission, dedicated resource may be used for initial Msg4 (with temporary C-RNTI), and USS may be used after initial Msg4. Alternatively, USS with temporary C-RNTI may always be used. Alternatively, similar to D-CSS, CSS-like control channel may be used. CSS in UE-specific NB may schedule RAR/Msg4/paging and reconfiguration of UE-specific configurations after UE-specific NB is configured.

TDM between CSS and USS in the same NB may be considered. At least different repetition levels may be used for CSS and USS.

(4) Option 4: Dedicated resource+USS in a UE-specific NB

In this option, a dedicated PDSCH or resource schedules RAR and initial configuration of UE-specific configuration before UE-specific NB is configured. RAR/paging may be transmitted via the dedicated resource even after UE-specific NB is configured. Further, USS may schedule reconfiguration of UE-specific configuration. In this case, CE level reconfiguration issue may need to be handled. All CE levels may always be monitored, which cause high blind detection complexity. Or, different CE levels per each M-PDCCH set may be configured (one set with higher CE level)

The definition of CSS may be differentiated from that of USS as follows in terms of RNTIs, repetition levels and/or aggregation levels.

CSS may be defined as a set of search space where non C-RNTI based RNTIs (such as P-RNTI, RA-RNTI, transmit power control RNTI (TPC-RNTI), etc.) may be read as well. Further, CSS and USS may also have different set of blind detection candidates in terms of repetition levels and/or aggregation levels. On the other hand, USS may be defined a set of search space where only C-RNTI (and also semi-persistent scheduling (SPS) C-RNTI, temporary C-RNTI) is monitored.

CSS may be only differentiated from USS in terms of repetition level and/or aggregation level. In that sense, USS may also carry non C-RNTI based transmission for cell-common data. In other words, only CSS may be configured where two different sets of {repetition level, aggregation level} may be configured.

Hereinafter, more detail description of each option for scheduling resources for RAR/Msg4/paging described above will be described below.

(1) Option 1: D-CSS+USS NB

In option 1, D-CSS is configured by SIB. The UE may monitor the D-CSS to receive scheduling information for RAR and Msg4. Initial and reconfiguration of UE-specific configuration parameters (i.e. RRC messages) can also be scheduled via D-CSS. One NB (virtual or physical) may be configured for D-CSS NB by SIB or predefined in the specification. Potentially, D-CSS NB and UE-specific NB may be different from each other. In such a case, a UE may retune to D-CSS NB to acquire scheduling information for such as RAR, Msg4 and RRC messages. Thus, if this option is used, TDM between D-CSS and USS may be essential. Using this option, it is possible that a UE acquires RRC messages via USS as well. However, in case of RRC reconfiguration message which changes NB or coverage/repetition level of M-PDCCH, it may be inefficient to schedule RRC message via USS.

FIG. 6 shows an example of scheduling DL messages according to an embodiment of the present invention. Referring to FIG. 6, D-CSS NB is configured at DL subframe A. The UE may monitor the D-CSS to receive scheduling information for RAR at DL subframe B. Further, D-CSS NB is configured at DL subframe A'. The UE may monitor the D-CSS to receive scheduling information for RRC message, which corresponds to initial and reconfiguration of UE-specific configuration including M-PDCCH configuration, at DL subframe B'. Afterwards, the UE may monitor USS at DL subframe C'.

(2) Option 2: D-CSS+CSS/USS in a UE-specific NB

In option 2, different behaviors for the case where a UE is not configured with UE-specific NB in which a UE is monitoring USS and the case after UE-specific NB is configured. RAR/Msg4 corresponding to initial access (before configured with C-RNTI) or paging in RRC_IDLE or initial configuration of UE-specific configuration may be scheduled via D-CSS. Once a UE is configured with UE-specific NB, the UE may expect to receive M-PDCCH scheduling RAR/Msg4 and RRC message from the same NB via CSS configured in that NB. When CSS is configured in the UE-specific NB with USS, one of the following alternatives may be considered.

Alt 1: A UE may always monitor both CSS and USS in each starting subframe for M-PDCCH. In this case, if high repetition level is assumed for CSS, a UE may always have to search high repetition level. To allow reconfiguration CE level change or common scheduling over different repetition levels, repetition level monitored for CSS may be higher than USS.

Alt 2: CSS and USS may have different starting subframe sets. If this is used, the set of starting subframe for CSS may be more restricted compared to USS. Thus, it may restrict the possible occasion of M-PDCCH scheduling via CSS. For example, if enhanced PHICH (EPHICH) is used which is scheduled via CSS, this may restrict the occasion of EPHICH transmission.

FIG. 7 shows another example of scheduling DL messages according to an embodiment of the present invention. Referring to FIG. 7, for initial access, D-CSS NB is configured at DL subframe A. The UE may monitor the D-CSS to receive scheduling information for RAR at DL subframe B. For initial configuration of UE-specific configuration including M-PDCCH configuration, D-CSS NB is configured at DL subframe A'. The UE may monitor the D-CSS to receive scheduling information for RRC message at DL subframe B'. Afterwards, the UE may monitor CSS/USS at DL subframe C' in the UE-specific NB. After initial setup, CSS is configured at DL subframe E in that UE-specific NB. The UE may monitor CSS to receive scheduling information for RRC message at DL subframe F. For reconfiguration of UE-specific configuration including M-PDCCH configuration, CSS is configured at DL subframe E' in that UE-specific NB. The UE may monitor CSS to receive scheduling information for RRC message at DL subframe F'.

(3) Option 3: Dedicated resource+CSS/USS in a UE-specific NB

In option 3, instead of configuring the D-CSS, dedicated resource(s) is configured for channel/data transmission before a UE is configured with UE-specific NB. For example, RAR may be transmitted via a dedicated resource and UE-specific configuration may be given by SIB or RAR or Msg4 (or a combination of those). For Msg4 transmission, one of the following alternatives may be considered.

Alt 1: Dedicated resource may be used for initial Msg4 (based on temporary C-RNTI) and M-PDCCH may schedule after initial Msg4.

Alt 2: M-PDCCH in USS may always schedule Msg4 assuming that temporary C-RNTI is equal to C-RNTI (this requires that M-PDCCH configuration is done before Msg4).

Alt 3: Mini-CSS or dedicated control resource/region may be used for Msg4.

Once a UE is configured with UE-specific NB, similar to option 2 described above, CSS in the same NB may be used to schedule RAR/Msg4 and reconfiguration of RRC messages.

FIG. 8 shows another example of scheduling DL messages according to an embodiment of the present invention. Referring to FIG. 8, for initial access, SIB for dedicated resource is configured at DL subframe A. The SIB may include a list of MPDCCH configurations. For initial configuration, the UE may receive RAR indicating a temporary C-RNTI at DL subframe B, and the UE may monitor CSS/USS at DL subframe C in the UE-specific NB. After initial setup, CSS is configured at DL subframe E in that UE-specific NB. The UE may monitor CSS to receive scheduling information for RRC message at DL subframe F. For reconfiguration of UE-specific configuration including M-PDCCH configuration, CSS is configured at DL subframe E' in that UE-specific NB. The UE may monitor CSS to receive scheduling information for RRC message at DL subframe F'.

(4) Option 4: Dedicated resource+USS in a UE-specific NB

This option is similar to option 3, except that CSS is not defined in a UE-specific NB. In this case, RAR/paging may be transmitted from the dedicated resource which is configured for initial setup procedure even after the UE is configured with a UE-specific NB. RRC message of UE-specific reconfiguration may be scheduled via USS in the UE-specific NB. To address the case where reconfiguration of repetition/CE level changes, one of the following alternatives may be considered.

Alt 1: A UE may monitor all repetition/CE levels such that reconfiguration of repetition/CE level of M-PDCCH is not required. This approach may be inefficient in terms of UE-power and complexity. Particularly for a UE with small repetition/CE level, this approach can be inefficient.

Alt 2: Two different M-PDCCH set may be configured. Each M-PDCCH set may have different set of aggregation level(s) and/or repetition level(s) and individual starting subframe set.

FIG. 9 shows another example of scheduling DL messages according to an embodiment of the present invention. Referring to FIG. 9, for initial access, SIB for dedicated resource is configured at DL subframe A. The SIB may include a list of MPDCCH configurations. For initial configuration, the UE may receive RAR indicating a temporary C-RNTI at DL subframe B, and the UE may monitor USS at DL subframe C in the UE-specific NB. For reconfiguration of UE-specific configuration including M-PDCCH configuration, USS is configured at DL subframe D in that UE-specific NB. The UE may monitor USS to receive scheduling information for RRC message at DL subframe E.

Though there may be some variations in each option, these options described above may be categorized based on D-CSS and CSS in a UE-specific NB. Table 1 shows benefits and drawbacks of each option.

TABLE 1

| | Benefits | Drawbacks |
|---|---|---|
| Option 1: D-CSS + USS | No need of dedicated resource configuration for cell broadcast transmissions such as paging/RAR/Msg4. | UE may need to retune to D-CSS NB if TDM is used Configuration of D-CSS may be necessary. In CE, overhead of M-PDCCH for cell-broadcast transmission may be inefficient. |
| Option 2: D-CSS + CSS/USS in a UE-specific NB | No need of dedicated resource configuration for cell broadcast transmissions such as paging/RAR/Msg4. No need of retuning to monitor CSS. | Configuration of D-CSS may be necessary. Configuration of CSS in a UE-specific NB may be necessary. In CE, overhead of M-PDCCH for cell-broadcast transmission may be inefficient. |

TABLE 1-continued

| | Benefits | Drawbacks |
|---|---|---|
| Option 3: Dedicated resource + CSS/USS in a UE-specific NB | In CE, overhead of M-PDCCH for cell-broadcast transmission may be reduced. Reconfiguration of CE level change may be supported efficiently via CSS in a UE-specific NB. | Flexibility in terms of multiplexing multiple cell-broadcast transmissions may be limited. Initial configuration of UE-specific configuration may require considerable specification impact. |
| Option 4: Dedicated resource + USS in a UE-specific NB | In CE, overhead of M-PDCCH for cell-broadcast transmission can be reduced. | Flexibility in terms of multiplexing multiple cell-broadcast transmissions may be limited. Initial configuration of UE-specific configuration may require considerable specification impact. Configuration of CE level seems not easily supported by this option. |

If Option 1 is used, at least one of the followings may be required to be configured for configuration of D-CSS.

NB of D-CSS: If dedicated, the first NB (virtually the first) may be used for D-CSS. Or, the next NB to SIB-1 NB may also be used for D-CSS.

Search space configuration: For enhanced coverage and normal coverage, two sets of blind decoding candidate and/or search space may be needed. For normal coverage, enhanced PDCCH (EPDCCH) configuration for D-CSS may be necessary with a default demodulation reference signal (DM-RS) scrambling ID. For normal coverage, a set of aggregation levels, e.g. 8 or 16, may be configured or prefixed. For CE, a set of aggregation levels and/or a set of repetition levels that a UE shall monitor for CE mode may be configured or prefixed. One simple approach of repetition levels may be to fix to monitor all repetition levels where only one aggregation level which is determined by the number of PRBs configured for D-CSS is assumed. For example, if 6 PRBs is configured for D-CSS, 24 aggregation levels may be assumed. On the other hand, if 4 PRBs is configured for D-CSS, 16 aggregation levels may be assumed. In terms of PRBs for D-CSS, a default value may be 6 PRBs, though optionally the number of PRBs may be configured. In case of indication of 6 PRBs, instead of utilizing current mechanism of resource allocation, NB+{0, 1, 2} may be indicated, where 0 means 2 PRBs (starting from the lowest PRB), 1 means 4 PRBs (starting from the lowest PRB), and 2 means 6 PRBs. Additionally, 1 more state may be used to refer 2 PRBs starting from the lowest or highest PRB within a NB.

Default PUCCH offset: To support, e.g. ACK/NACK transmission, a default resource offset may be configured.

USS may configured via RRC message scheduled by D-CSS.

If Option 2 is used, configuration of D-CSS may be the same as option 1 described above. Further, details of USS/CSS coexistence in a same NB may be addressed separately. Further, when CSS is configured, a default ACK/NACK resource may be configured separately.

If Option 3 is used, dedicated resource for cell broadcast data may be required to be configured. Further, for initial reconfiguration, at least one of the following approaches may be considered.

SIB itself may contain the list of EPDCCH configurations. The EPDCCH configuration may be determined by C-RNTI % M, where M is the number of EPDCH configurations contained in SIB.

SIB itself may contain scheduling information of PDSCH where actual configuration of list of EPDCCH configuration is transmitted. For CE support, the number of repetition in addition to starting subframe may be necessary. Also, separate configuration of this type of resource for normal coverage and CE may be further considered.

RAR itself may contain the EPDCCH configuration which will be used once contention resolution is completed.

RAR may include only occasion, transport block size (TBS), repetition number of PDSCH where EPDCCH configuration is transmitted.

Msg4 itself may contain the EPDCCH configuration which will be used once contention resolution is completed.

Msg4 may include only occasion, TBS, repetition number of PDSCH where EPDCCH configuration is transmitted.

A set of dedicated resource may be configured which contains EPDCCH configurations only. For example, the set of dedicated resource may be K subframe after Msg4 transmission (initial Msg4). K may be prefixed or configured by the network. The repetition number used for EPDCCH configuration may be the maximum or prefixed or configured by the network per CE level used by PRACH. In other words, the number of repetition may be used for EPDCCH configuration after Msg4 can be derived from the CE level used by PRACH and/or higher layer configuration.

If option 3 or option 4 is used, handling of RRC ambiguity may be needed. For example, in option 4, CE level may change where RRC message may not be received by the UE due to mismatch of CE level. For example, if a UE experiences a sudden CE level increase, this issue may arise. In this case, a UE may initiate PRACH again to setup the CE level. In case of option 3/4, if NB location of M-PDCCH is changed, there may be the ambiguity issue. To address this issue, option 2 may be used where a UE reads D-CSS occasionally. In case the network needs to reconfigure NB location, the network may transmit RRC reconfiguration message via D-CSS. This may not be so useful if the interval between D-CSS monitoring is large, as it may cause failure of data reception until the UE can successfully receive the reconfiguration message. Another approach to handle the ambiguity is to transmit M-PDCCH in both NBs with different configuration until the network is assumed that the UE has received the RRC reconfiguration message. From a UE perspective, it applies the subband location change once it received reconfiguration message.

One issue with this approach is that if ACK/NACK resource is determined by MPDCCH NB, there is ambiguity from the network perspective. For this, one state in ACK/NACK resource indicator offset (ARO) may be reserved to indicate to use a dedicated ACK/NACK resource configured to a UE may be used instead of implicit resource. In other words, the network may dynamically indicate a fallback of ACK/NACK resource to the known ACK/NACK resource when ambiguity issue arises. Another option is to use ACK/NACK resource mapped to CSS which may also be directly indicated by DCI.

Meanwhile, when option 2 or option 3 is used, the following shows an example of resource indication/assignment. In terms of configuring/assigning NB(s) for each channel, the following may be considered.

SIB1: A dedicated NB may carry SIB1 which may be hopped if frequency hopping is enabled.

PRACH resource configuration: At most one separate NB may be allocated per CE level. If the network supports 3 CE levels with normal coverage, total four NBs may be used for PRACH resources.

RAR resource configuration: If RAR is scheduled with the associated M-PDCCH, in normal coverage, one NB for M-PDCCH for RAR may be configured. PDSCH may be scheduled in a different NB via DCI. In CE, one NB for PDSCH may be semi-statically configured per CE level used by PRACH. If RAR is scheduled without the associated MPDCCH, at most one NB may be allocated per CE level used by PRACH.

Paging resource configuration for RRC_IDLE UEs: Depending on paging occasion, one or multiple NBs may be configured by the network. If paging is scheduled with the associated M-PDCCH, in normal coverage, one NB for M-PDCCH for paging may be configured. PDSCH may be scheduled in a different NB via DCI. In CE, one NB for PDSCH may be semi-statically configured per CE level used by PRACH. Otherwise, if multiple NBs are configured, NB may be determined by P-RNTI.

Msg4 (temporary C-RNTI): If Msg4 is scheduled with the associated M-PDCCH, in normal coverage, one NB for M-PDCCH for Msg4 may be configured. PDSCH may be scheduled in a different NB via DCI. In CE, one NB for PDSCH may be semi-statically configured per CE level used by PRACH. If Msg4 is scheduled without the associated MPDCCH, at most one NB may be allocated per CE level used by PRACH.

If CSS is introduced, a dedicated NB carrying CSS for RAR, paging and Msg4 (temporary C-RNTI) may be considered. Using this CSS, initial configuration of UE-specific configuration such as M-PDCCH configuration may be configured before USS is configured. NB used for PDSCH scheduled by DCI via this CSS may be indicated by DCI or semi-statically configured per repetition level used in DCI. Once UE-specific NB is configured, the same NB may also be used for RAR, paging and Msg4 to minimize retuning to other NBs and service interruption time. The followings may be considered.

RAR: If PRACH is triggered by PDCCH order and RAR is scheduled with the associated M-PDCCH, NB for M-PDCCH may be the same as the NB of USS for the given UE. The same mechanism to determine a NB of PDSCH scheduled by USS may be used for PDSCH NB of RAR. Otherwise, the same resource as initial PRACH transmission may be monitored.

Paging resource for RRC_CONNECTED UEs: If paging is scheduled with the associated M-PDCCH, the same NB as UE-specific NB may be used for paging as well. The same mechanism to determine a NB of PDSCH scheduled by USS may be used for PDSCH NB of paging. Otherwise, the same resource as initial PRACH transmission may be monitored.

Msg4: If Msg4 is scheduled with C-RNTI and with the associated M-PDCCH, NB for M-PDCCH may be the same as the NB of USS for the given UE. The same mechanism to determine a NB of PDSCH scheduled by USS may be used for PDSCH NB of Msg4. Otherwise, the same resource as initial PRACH transmission may be monitored.

RRC reconfiguration message: RRC reconfiguration message may be scheduled with the associated M-PDCCH. The NB of M-PDCCH may be same as the NB of USS, though it may use non-UE-specific SS.

Multiple CSS NBs may be configured

Different CSS NB may be monitored per purpose (e.g. different NB between paging and RAR)

Same NB may be used for CSS and USS when a UE is connected.

FIG. 10 shows a method for receiving, by a UE, a downlink message according to an embodiment of the present invention. This embodiment may correspond to option 2 described above.

In step S100, the UE receives scheduling information for a downlink message via a D-CSS in a first narrowband from a network. The UE may receive a configuration for the D-CSS from the network. The configuration may include at least one of a configuration of the first narrowband or a search space configuration.

In step S110, the UE receives the downlink message in the second narrowband from the network. The downlink message corresponds to one of a random access response for an initial access, a contention resolution message for the initial access, or a paging message. Or, the downlink message corresponds to a RRC message for an initial configuration of a UE-specific configuration. In this case, the UE-specific configuration may include a configuration of an M-PDCCH, and the UE-specific configuration may configure a third narrowband for the M-PDCCH. The UE may further receive scheduling information for a reconfiguration of the UE-specific configuration via a CSS in the third narrowband from the network after the third narrowband is configured. The CSS and a USS may be configured in the third narrowband via TDM. Different repetition levels from each other may be used for the CSS and the USS, respectively. A repetition level for the CSS may be higher than a repetition level for the USS. Both the CSS and the USS may be monitored in each starting subframe for the M-PDCCH. The CSS and the USS may have different starting subframe sets from each other.

FIG. 11 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A MTC UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method performed by a user equipment (UE), in a wireless communication system, the method comprising:
   receiving a configuration of starting subframe sets for a control channel in a common search space (CSS) from a network via system information;
   monitoring the control channel on a first narrowband in the CSS based on the starting subframe sets, wherein the first narrowband is a default narrowband;
   receiving a message 4 of a random access procedure based on the monitored control channel, wherein the message 4 is related to a temporary cell radio network temporary identity (C-RNTI);
   monitoring the control channel on the first narrowband until receiving a configuration of a second narrowband, wherein the second narrowband is different from the first narrowband;
   receiving the configuration of the second narrowband from the network; and
   monitoring the control channel based on the second narrowband in a UE-specific search space (USS).

2. A user equipment (UE) in a wireless communication system, the UE comprising:
   a memory;
   a transceiver; and
   a processor coupled to the memory and the transceiver, wherein the processor is configured to:
   control the transceiver to receive a configuration of starting subframe sets for a control channel in a common search space (CSS) from a network via system information,
   control the transceiver to monitor the control channel on a first narrowband in the CSS based on the starting subframe sets, wherein the first narrowband is a default narrowband,
   control the transceiver to receive a message 4 of a random access procedure based on the monitored control channel, wherein the message 4 is related to a temporary cell radio network temporary identity (C-RNTI),
control the transceiver to monitor the control channel on the first narrowband until receiving a configuration of a second narrowband, wherein the second narrowband is different from the first narrowband,
control the transceiver to receive the configuration of the second narrowband, and
monitor the control channel based on the second narrowband in a UE-specific search space (USS).

* * * * *